W. H. GRABE & J. BRANT.
CORN PLANTER.
APPLICATION FILED AUG. 6, 1909.

978,735.

Patented Dec. 13, 1910.

Witnesses

Inventors
William H. Grabe
James Brant

By Frank Fuller
Attorney

UNITED STATES PATENT OFFICE.

WILLIAM H. GRABE AND JAMES BRANT, OF FORT GAGE, ILLINOIS.

CORN-PLANTER.

978,735. Specification of Letters Patent. Patented Dec. 13, 1910.

Application filed August 6, 1909. Serial No. 511,517.

*To all whom it may concern:*

Be it known that we, WILLIAM H. GRABE and JAMES BRANT, citizens of the United States, residing at Fort Gage, in the county of Randolph and State of Illinois, have invented certain new and useful Improvements in Corn-Planters, of which the following is a specification.

Our invention relates to new and useful improvements in corn planters.

The objects of our invention are to provide corn planter attaching devices for dropping corn, and accurately marking and checking the rows without the use of a check row wire, making the rows even and enabling the operator to plant close to fences and in the turning points or ends of the rows.

A further object is to provide a practical and economical dropper and check row corn planter attachment, adaptable to the ordinary two wheeled planters having seed boxes or hoppers provided with any of the usual means for regulating the discharge of seeds.

With these objects in view, an exact description of our invention is given so that those skilled in the art to which it appertains may make and use the same, reference being had to the accompanying drawing, which form a part of these specifications, and wherein like figures refer to corresponding parts, and in which—

Figure 1 is a top plan of an entire planter, with our invention attached. Fig. 2 is a sectional side view, in detail, of the marker and Fig. 3 is a sectional side view of the operating mechanism.

Any of the forms of two wheeled corn planters can be used with our invention which consists of seed hoppers, 1—1, suitably mounted on the frame work and secured by convenient bolts and nuts, and provided with the usual seed regulating and discharging devices in common use, to which our dropper mechanism may be conveniently attached.

2 is a sprocket wheel, approximately centrally mounted on the axle of the transporting wheels of the planter, transmitting motion by means of a linked chain 3 to a second sprocket wheel 4, which is firmly mounted on a driving shaft, 5; this shaft 5 is loosely mounted in front of and parallel with the axle journaled in convenient boxings on the planter frame.

Rigidly mounted on shaft 5, near one end, is a wheel, 6, which is provided near its rim with a lateral trip pin, 7, secured in position by any convenient means, and adapted to intermittently engage an arm 8, of the operating mechanism, as hereinafter detailed.

8 is a trip or actuating arm of the dropper, curved at its free end where it comes in contact with trip pin 7, and pivoted to an elbow, 8' to one end of a supporting rod 9, which may be suitably bolted at its other end to the planter frame in substantially a vertical position. Arm 8 at its other end is pivotally connected with a second member, 10, of the operating shaft, which is likewise similarly pivoted to a third member, 11, and this third member 11 is journaled on rocking shaft 12 at point 11'.

12 is a rocking shaft, extending horizontally across the frame of the planter so positioned that the ends extend under the bottoms of the seed hoppers, 1—1, where arm 11 of the dropper mechanism is suitably attached, actuating the seed dropping devices in the bottom of the hoppers 1—1.

17 is a wheel provided with a flanged, lateral rim, and is rigidly journaled on the end of driving shaft 5. The flanged lateral rim of wheel 17 is provided with an indentation or open slot, 18, adapted to intermittently receive and engage the lever 20, of the marker and check row attachment actuated by driving shaft 5.

20 is a lever, provided at one end with a curved portion, 19, adapted to periodically engage the open slot 18 on the rim of wheel 17, thus actuating the lever at definite intervals in the rotation of the wheel, thereby imparting motion to the marking attachment hereinafter referred to. Lever 20 is pivotally mounted at, 21, on a vertical fulcrum bar, 22, which is suitably secured at its opposite end to a beam, 23, conveniently provided on the frame. The opposite end of lever 20, from its curved portion, is pivotally connected as at 24, with a vertically extending marking rod 25, of suitable length to extend sufficiently into the soil for marking and checking purposes, when in use. The lever 20, is connected with the extension beam 23, between the fulcrum bar 22 and the marking shaft 25, by a coil spring, and the shaft 25 is inserted vertically through a like coil spring, 26', for the purposes hereinafter mentioned.

Having described in detail the construction of the various parts of our invention, the operation is as follows:—As the wheeled vehicle is set in motion, the axle on which sprocket wheel 2 is rigidly journaled, imparts motion to sprocket wheel 4, by means of chain 3, which in turn actuates the driving shaft 5, on which is mounted wheel 6 provided with the trip pin 7, and as wheel 6 revolves the pin 7 strikes the arm 8 of the dropper, this arm immediately moves on its pivoted elbow 8', transmitting motion to the pivotally coöperating arms 10 and 11, of the dropper mechanism, and as arm 11 is journaled on oscillating shaft 12 it imparts motion to this shaft, thereby driving the seed retaining and releasing devices in the hoppers, 1—1, causing the seed to be discharged, in the ordinary manner. As wheel 6 revolves, trip pin 7 disengages arm 8, and this member returns to its primary position by gravity action of the various arms of the dropper and awaits the rotation of wheel 6, with pin 7, when the same movements are repeated, and continue while the machine is in motion.

The marker and check row device operates in the following manner:—as the axle revolves the sprocket wheel 2 mounted thereon transmits motion to the connecting chain 3 and sprocket wheel 4 on driving shaft 5, thereby wheel 17 mounted on the end of driving shaft 5, is revolved, and the curved end portion 19, of the lever 20, engages the open slot 18 in said wheel 17, as the same turns with the driving shaft 5, and the curved portion drops into the slot, thereupon the coil spring 26, attached to lever 20, pulls the lever downward, and operating on fulcrum bar 22, at the pivotal point 21, the marking shaft 25 is brought in contact with the soil, suitably marking the rows and hills for the planting of corn that is to follow. As wheel 17 continues to revolve, the curved end portion 19 of the lever 20, is expelled from the slot 18 in the wheel, as it strikes the full rim thereof, and at the same time the resiliency of coil spring 26', surrounding marking shaft 25, forces lever 20 upward into its original position, disengaging periodically the marking shaft 25 from the soil, in which position it remains until another revolution of wheel 17, when the curved portion 19 of the lever 20 again engages slot 18 in the rim of wheel 17, and the operation as detailed is repeated, and this movement is kept up during the use of the planter.

4' is a clutch wheel abutting sprocket wheel 4, and is adapted to throw the mechanism in or out of operative position in the ordinary and usual manner.

Having described our invention and its operation, what we claim and desire to secure by Letters Patent is:—

1. In a device of the character described, a dropper and marker device consisting of a revoluble shaft and means for transmitting motion thereto from the axle of a corn planter; a wheel rigidly mounted on said revoluble shaft and provided with a lateral trip pin and adapted to transmit intermittent motion to the trip arm of the dropper mechanism; a dropper mechanism having a trip arm and coacting members pivotally connected and attached to the seed retaining and discharging device of the hoppers; a wheel mounted on said revoluble shaft provided with an open slot lateral to the rim thereof and adapted to intermittently engage a curved lever pivotally attached to the marker; a curved lever fulcrumed on the frame of a planter, one end thereof pivotally attached to the marking shaft, the other end curved, and at its curvature adapted to intermittently engage the slot in the lateral rim of the wheel on the end of the revoluble shaft; a marking shaft pivotally attached to the said curved lever and actuated thereby; means for retaining said curved lever and marker in operative position, and for throwing the mechanism in and out of gear, all substantially as set forth.

2. In a device of the character described, a revoluble shaft adapted to be mounted on a planter frame in parallel relation to the axle and means for transmitting motion from the axle to the said revoluble shaft; hoppers mounted on the front end of the said frame opposite each other; a wheel rigidly mounted on said revoluble shaft and provided with a lateral trip pin of the hopper mechanism; a dropper mechanism consisting of the engaging trip arm pivotally connected to the coacting members attached to the seed releasing and retaining device of the hopper; a second wheel rigidly mounted on the end of the said revoluble shaft and having an open slot lateral to the rim thereof and adapted to intermittently engage the curved lever pivotally attached to the vertical marking shaft; a curved lever, fulcrumed on the planter frame, and adapted to intermittently engage the slot in the lateral rim of the wheel on the end of the revoluble shaft; a vertically movable marking shaft pivotally attached to the said curved lever and actuated thereby; a resilient spring surrounding said marking shaft, and a like spring attached to the curved lever, and means for operating the same, all substantially as and for the purposes set forth.

In testimony whereof we affix our signatures in presence of two witnesses.

WILLIAM H. GRABE.
JAMES ✕ BRANT.
his
mark

Witnesses:
J. H. RAGSDALE,
R. N. GATEWOOD.